(12) United States Patent  
Cai (10) Patent No.: US 8,349,211 B2
(45) Date of Patent: Jan. 8, 2013

(54) FLUORESCENT ADDITIVES FOR INK (75) Inventor: Xiaorong Cai, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 589 days.

(21) Appl. No.: 12/126,406

(22) Filed: May 23, 2008

(65) Prior Publication Data

US 2009/0288580 A1    Nov. 26, 2009

(51) Int. Cl.
*C09K 11/02* (2006.01)
*C09D 11/00* (2006.01)

(52) U.S. Cl. ................ 252/301.36; 106/31.32
(58) Field of Classification Search .......... 252/301.36, 252/301.16, 301.33, 301.4 R, 301.34, 301.35, 252/31.13, 31.15, 31.32, 31.64, 31.27, 31.28, 252/31.57, 31.6, 31.65, 31.85; 106/31.13, 106/31.15, 31.32, 31.64, 31.27, 31.28, 31.57, 106/31.6, 31.65, 31.85, 31.14
See application file for complete search history.

(56) References Cited

U.S. PATENT DOCUMENTS

| | | | |
|---|---|---|---|
| 6,203,603 B1 * | 3/2001 | Takayama et al. | 106/31.16 |
| 6,264,730 B1 * | 7/2001 | Matsumura et al. | 106/31.43 |
| 6,576,396 B1 * | 6/2003 | Leichsenring et al. | 430/270.1 |
| 6,623,557 B2 * | 9/2003 | Hayashi et al. | 106/499 |
| 7,001,936 B2 | 2/2006 | Akers, Jr. et al. | |
| 7,111,933 B2 * | 9/2006 | Morris et al. | 347/98 |
| 7,118,620 B2 | 10/2006 | Jayaram | |
| 7,897,653 B2 * | 3/2011 | Iftime et al. | 522/75 |
| 2003/0041774 A1 * | 3/2003 | Auslander et al. | 106/31.32 |
| 2003/0092884 A1 * | 5/2003 | Lukyanov et al. | 530/350 |
| 2003/0101908 A1 * | 6/2003 | Hayashi et al. | 106/417 |
| 2004/0027404 A1 * | 2/2004 | Nagashima et al. | 347/8 |
| 2004/0220298 A1 * | 11/2004 | Kozee et al. | 523/160 |
| 2004/0231554 A1 * | 11/2004 | Udagawa et al. | 106/31.15 |
| 2004/0241424 A1 * | 12/2004 | Barbera-Guillem | 428/326 |
| 2005/0137393 A1 * | 6/2005 | Goswami et al. | 536/54 |
| 2005/0150422 A1 * | 7/2005 | Umemura et al. | 106/31.15 |
| 2005/0279248 A1 * | 12/2005 | Auslander | 106/31.28 |
| 2005/0282929 A1 | 12/2005 | Beach et al. | |
| 2005/0288391 A1 | 12/2005 | Beach et al. | |
| 2006/0001719 A1 * | 1/2006 | Fukushige | 347/100 |
| 2006/0167135 A1 | 7/2006 | Beach et al. | |
| 2006/0205840 A1 * | 9/2006 | Kato et al. | 523/160 |
| 2006/0293409 A1 * | 12/2006 | Sanchez et al. | 523/160 |
| 2007/0163468 A1 | 7/2007 | Cai | |
| 2009/0038507 A1 * | 2/2009 | Akers et al. | 106/31.26 |

FOREIGN PATENT DOCUMENTS

JP        11080632 A   *   3/1999

OTHER PUBLICATIONS

Machine translation of JP 11080632 A.*

* cited by examiner

*Primary Examiner* — Emily Le
*Assistant Examiner* — Lynne Edmondson (57) ABSTRACT

The present invention relates to a fluorescent inkjet composition. The inkjet composition includes a fluorescent dispersion including a fluorescent colorant; wherein the inkjet composition emits light at a first intensity $I_1$ in the range of 450 nm to 700 nm upon excitation by incident light having a wavelength in the range of 250 to 400 nm. In addition, the inkjet composition is capable of emitting light at a second intensity $I_2$ upon exposure to a temperature of 60 ° C. for 8 weeks, wherein $I_2 = (0.50 \text{ to } 1.0) * I_1$.

21 Claims, 4 Drawing Sheets

FLUORESCENT ADDITIVES FOR INK

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to providing stable fluorescent additives for use in an ink composition, which may be used in ink detection or security applications.

2. Description of the Related Art

Identifying and detecting specific ink compositions used in an image forming device may allow for the image forming device to optimize print quality based on the ink identified. In addition, identifying and detecting specific ink compositions may help in solving printhead warranty issues. To identify the ink, the ink may include a fluorescent additive. The fluorescent additive in the inks may be detected by emitting a UV light, from an LED or other light source, and detecting light emitted from the ink using a phototransistor. Inks may be identified by the amount of light emitted by the inks, by the wavelength(s) at which the ink emits light as well as other characteristics of the emitted light.

Fluorescent additives, however, may often loose their ability to provide fluorescence over time, or upon exposure to an environmental condition (e.g. heat). This may be the result of decomposition and/or alteration of the chemical structure of the fluorescent additive, thereby compromising its ability to absorb light and fluoresce. It may also be due to a shift in the additives' ability to fluoresce at a particular excitation wavelength or range of wavelengths. That being the case, it would be useful to develop a stable ink formulation that offers fluorescence over the course of its anticipated shelf life for a given printing application.

SUMMARY OF THE INVENTION

An aspect of the present disclosure relates to a fluorescent inkjet composition. The fluorescent inkjet composition may include a fluorescent dispersion including a fluorescent colorant; wherein the inkjet composition may emit light at a first intensity $I_1$ in the range of 450 nm to 700 nm upon excitation by incident light having a wavelength in the range of 250 to 400 nm. In addition, the inkjet composition may be capable of emitting light at a second intensity $I_2$ upon exposure to a temperature of 60° C. for 8 weeks, wherein $$I_2=(0.50 \text{ to } 1.0)*I_1.$$

Another aspect of the present disclosure relates to a fluorescent inkjet composition. The inkjet composition may include an aqueous dispersion including a fluorescent colorant; wherein the inkjet composition may emit light at a first intensity $I_1$ in the range of 450 nm to 700 nm upon excitation by incident light having a wavelength in the range of 250 to 400 nm. In addition, the inkjet composition may capable of emitting light at a second intensity $I_2$ for a period of one year at temperatures of 18° C. to 28° C., wherein $$I_2=(0.50 \text{ to } 1.0)*I_1.$$

A further aspect of the present disclosure relates to a method of providing a fluorescent inkjet composition. The method may include combining a fluorescent dispersion including a fluorescent colorant with an inkjet composition; and wherein the inkjet composition may emit light at a first intensity $I_1$ in the range of 450 nm to 700 nm upon excitation by incident light having a wavelength in the range of 250 to 400 nm. In addition, the inkjet composition may be capable of emitting light at a second intensity $I_2$ upon exposure to a temperature of 60° C. for 8 weeks, wherein $$I_2=(0.50 \text{ to } 1.0)*I_1.$$

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present invention relates to ink formulations including fluorescent dispersions for water based pigment and/or dye inks, which may be used for ink identification as well as security inks. The inks may be used in an image forming device, such as a printer, copier, fax, all in one machine or a multifunction machine, as well as in other printing applications. The inkjet ink containing the fluorescent dispersions may remain stable, i.e., the fluorescent characteristics remain available and detectable under selected environmental conditions. For example, the fluorescent characteristics may remain available and provided a selected minimum intensity, upon exposure to an excitation wavelength, after 8 weeks at temperatures at or above room temperatures, e.g. temperatures up to and including 60° C. In addition, the fluorescent characteristics may remain for up to two years at room temperature, i.e., 18-28° C. The ink composition may therefore include the aforementioned fluorescent dispersion including one or more dispersants in an aqueous carrier.

Figure 1:
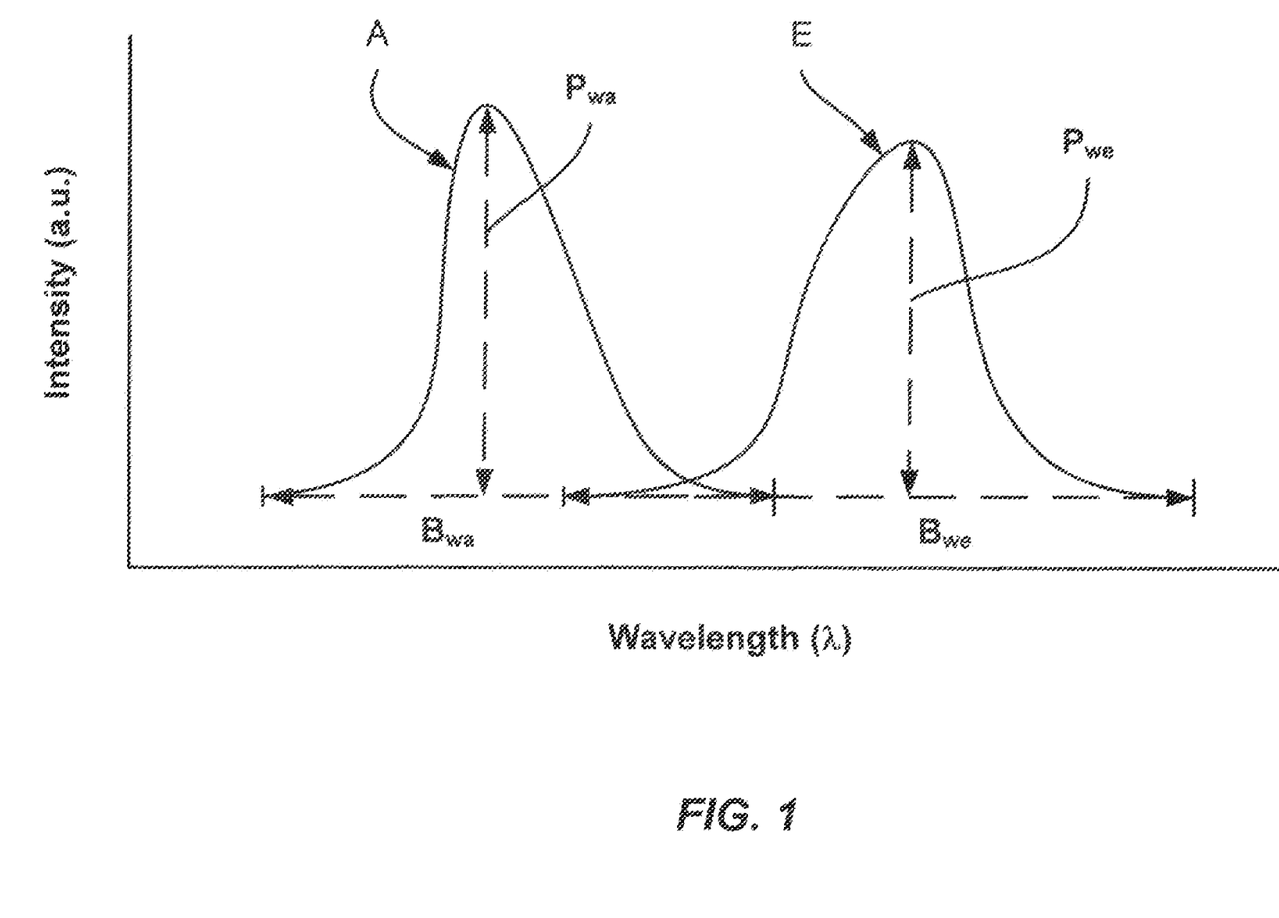
FIG. 1 illustrates an example of a plot of wavelength versus intensity for an emission spectra and excitation spectra of a fluorescent compound.

Fluorescence may be understood herein as luminescence or the emission of radiation, or light of a given wavelength(s), by a given fluorescent colorant, as a result of absorption of radiation, i.e., excitation light, at another, typically shorter, wavelength. FIG. 1 is a plot of wavelength (nm) versus intensity in arbitrary units (a.u.) illustrating an example of a substance that exhibits absorption in a given spectrum A, and emission in another given spectrum E. Each spectrum may exhibit one or more peak wavelength $P_{wa}$ (absorption) and one or more $P_{we}$ (emission). In addition, each spectrum may exhibit a bandwidth $B_{wa}$ (absorption) and $B_{we}$ (emission). The fluorescent colorant herein may also exhibit a fluorescent decay time, which may be understood as the amount of time in which the fluorescent colorant may fluoresce after removal of the radiation, or excitation light incident to the additive. Such decay time may be in the range of nanoseconds to a couple of seconds, including all values and increments in the range of $1 \times 10^{-9}$ to 2 seconds.

The fluorescent colorant and/or dispersion may therefore absorb light having a wavelength in the range of 250 nm to 400 nm, including all values and increments therein and emit light in the range of 450 nm to 700 nm, including all values and increments therein. In addition, the fluorescent additive may be relatively invisible to incident light in the visible spectrum, i.e., 380 nm to 750. The fluorescent colorant may be a pigment or a dye. In one example, the fluorescent colorant may include a metal complex organic pigment (e.g. the combination of a carbon compound with a metal atom such as nickel or copper) or aromatic organic pigment (a pigment containing one or more aromatic rings). The organic pigments may include those organic pigments that exclusively contain aromatic rings (i.e. no aliphatic carbons containing hydrogen atoms). Organic pigments that may be particularly useful also include those pigments that contain a xanthene ($C_{13}H_{10}O$) or thio-xanthene ($C_{13}H_{10}S$) type structure. The pigment particles may also be encapsulated with an inorganic polymer, such as a polysiloxane type polymer. As noted above, and as discussed more fully below, the fluorescent colorants herein are selected such that they provide stability as applied to a printing application. One example of such stable fluorescent colorant herein may include Keyfluor Green OB-505 or Keyfluor Yellow OB-549 available from Keystone Aniline Corp., Chicago, Ill.

As alluded to above, the fluorescent colorant and the corresponding dispersions when utilized in an inkjet composition herein are selected such that they may remain stable over a period of 8 weeks at 60° C., or 2 years at room temperature, i.e., 18-28° C. It may be appreciated that sustaining fluorescence at elevated temperatures for a given period of time (e.g. 8 weeks) for an inkjet composition may be indicative of the stability over the extended period of up to and including two years. Stability may be understood or measured in terms of the intensity of the light emitted by the fluorescent dispersion in the inkjet composition, over a given time period, wherein the characteristics of the incident light, such as incident light intensity, remains relatively constant. Thus, when formulated, the inkjet composition containing the fluorescent dispersion may exhibit a first light intensity $I_1$. A second light intensity $I_2$ may then be measured after the inkjet composition is exposed to a given environmental condition, such as being heated to 60° C. for up to 8 weeks or allowed to remain at room temperature for a period of, e.g., even one year. Under such conditions, the second intensity may be 50% to 100% of the first intensity, including all values and increments therein wherein:

$$I_2=(0.5 \text{ to } 1.0)*I_1.$$

Accordingly, it may be appreciated that the second intensity may be 51%, 52%, 53%, etc. up; to 100% of the original fluorescence intensity.

The fluorescent dispersion may be an aqueous dispersion. It may be processed for use in a given ink formulation, by reducing the particle size of the fluorescent colorant in the fluorescent dispersion to 25 nm to 200 nm, including all values and increments therein. For example, the fluorescent colorant may be processed in a wet media mill with distilled water and a dispersant. The dispersant may include polymeric dispersants such as acrylic copolymers, polystyrene acrylic polymers, alkali salts of sulphonated naphthalene formaldehyde condensates, lignin or lignin derivatives such as lignosulfonate, the reaction products with alkali sulfate and formaldehyde, etc. Examples of dispersants for the fluorescent colorant may include JONCRYL HDP696 available from BASF of Florham Park, N.J., TAMOL SN available from Rohm & Haas of Philadelphia, Pa., JONCRYL HDP296 available from BASF of Florham Park, N.J.

The fluorescent dispersion may include the fluorescent colorant in the range of 5% to 40% by weight of the total dispersion, including all values and increments therein. In addition, the fluorescent dispersion may include a dispersant in the range of 1% to 40% by weight of the total dispersion, including all values and increments therein. In addition, the fluorescent dispersion may include 20% to 90% by weight de-ionized water, including all values and increments therein. Furthermore, the fluorescent colorant may be present in the ink in the range of 0.01% to 1.5% of the weight of the ink composition, including all values and increments therein.

In addition to the above, the inkjet ink may also include a second colorant, in addition to the fluorescent dispersion (containing a fluorescent colorant), which may be detectable in the visible spectrum. That is, the second colorant may exhibit a color such as black, cyan, magenta, or yellow and combinations thereof. The second colorant may includes pigments and/or dyes, and may include, for example, organic pigments such as azo compounds, phthalocyanine pigments, quinacridone pigments, anthraquinone pigments, dioxazine pigments, indigo, carbon black, thioindigo pigments, perynone pigments, perylene pigments, and isoindolene; and inorganic pigments such as titanium dioxide, iron oxide, and metal powders. The amount of second colorant used may be less than 10 wt % of the total weight of the ink, including all values and increments therein, such as 0.5 to 10 wt %, or 0.5 to 7%. The second colorant may be water soluble or may be prepared as a colorant dispersion and added to a given ink formulation. The average particle size (at the largest particle diameter) of dispersed second colorants may be from 0.02 to 0.3 microns including all values and increments therein, including particles not more than 0.3 microns The inkjet ink may also include, for example, humectants, penetrants, chelating agents, buffers, biocides, fungicides, bactericides, surfactants, anti-curling agents, anti-bleed agents and surface tension modifiers. Useful humectants may include, for example, ethylene glycol, 1,3 propanediol, 1,4 butanediol, 1,4 cyclohexanedimethanol, 1,5 pentanediol, 1,2-hexanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, 2-pyrrolidone, 1-methyl-2-pyrrolidone, 1-methyl-2-piperidone, N-ethylacetamide, N-methylpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, sorbital, pantothenol, Liponic EG-1. The amount of humectant used may range from 1 to 30 wt % based on the total weight of the ink, including all values and increments therein, such as 5 to 15 wt %. Penetrants may include 1,2 $C_1$-$C_6$ alkyl diols, such as 1,2 hexanediol; N-propanol; isopropanol; and hexyl carbitol. The amount of penetrant used may range from 0.1 to 10 wt %, based on the total weight of the ink, including all values and increments therein.

The inkjet composition may be prepared by any method known in the art such as, for example, by mixing, stirring or agitating the ingredients together.

EXAMPLES

Example 1

A number of fluorescent dispersions were prepared as presented in Table 1. The fluorescent dispersions were then added to a number of ink formulations, wherein the ink formulations may separately include dye or pigment, dispersant, humectants, surfactants, penetrants, a biocide and other additives in an aqueous solution. Table 2 outlines the various ink formulations. It is noted that formulations 1-4 are pigment based formulations including magenta pigment, formulation 5 is a dye based formulation including magenta dye, and formulations 6-9 are also pigment based formulations including black pigment.

TABLE 1

| Fluorescent Dispersion | | | |
|---|---|---|---|
| Fluorescent Dispersion | Fluorescent Colorant | Polymer Dispersant | De-ionized Water |
| Fluo-Green Disp. 1 | 80 g Keyfluor Green OB505 | 133 g Joncryl HPD696, 20% active | 50 g De-ionized Water |
| Fluo-Green Disp. 2 | 80 g Keyfluor Green OB505 | 40 g Tamol SN | 150 g De-ionized Water |
| Fluo-Yellow Disp. 1 | 80 g Keyfluor Yellow OB549 | 133 Joncryl HPD696, 20% active | 50 g De-ionized Water |
| Fluo-Yellow Disp. 2 | 60 g Keyfluor Green OB549 | 84.5 g Joncryl HPD296, 35.5% active | 100 g De-ionized Water |

TABLE 2

| Ink Formulation | | |
|---|---|---|
| Ink Formulation | Fluorescent Dispersion | Ink Color |
| Formulation 1 | 0.4% Fluo-Green Disp. 1 | Magenta |
| Formulation 2 | 0.4% Fluo-Green Disp. 2 | Magenta |
| Formulation 3 | 0.4% Fluo-Yellow Disp. 1 | Magenta |
| Formulation 4 | 0.4% Fluo-Yellow Disp. 2 | Magenta |
| Formulation 5 | 0.4% Fluo-Green Disp. 1 | Magenta Dye |
| Formulation 6 | 0.4% Fluo-Green Disp. 1 | Black |
| Formulation 7 | 0.4% Fluo-Green Disp. 2 | Black |
| Formulation 8 | 0.4% Fluo-Yellow Disp. 1 | Black |
| Formulation 9 | 0.4% Fluo-Yellow Disp. 2 | Black |

The fluorescent dispersions described in Table 1 and the ink formulations of Table 2 were then examined for stability after exposure to a temperature of 60° C. for 8 weeks, a sample of which is set forth in Table 3. Stability of the inks was evaluated by examining the ink physical properties, separation of the various pigments and other components from the inks, the ability of the color of the ink to maintain its optical characteristics, and/or the performance of the ink during printing. Stability of the fluorescent dispersions was evaluated in terms of the ability of the fluorescent dispersions to retain its optical properties in the inks after environmental exposure, as described above. The fluorescent dispersions' stability was measured by exposing the fluorescent dispersions to a 365 nm UV LED and detecting the fluorescent emission using a phototransistor and measuring the signals from the phototransistor by a voltage meter.

TABLE 3

| Stability Data | | |
|---|---|---|
| Sample | Ink Stability | Fluorescent Stability |
| Fluor-Green Disp. 1 | Stable | Stable |
| Fluor-Green Disp. 2 | Stable | Stable |
| Fluor-Yellow Disp. 1 | Stable | Stable |
| Fluor-Yellow Disp. 2 | Stable | Stable |
| Ink Formulation 1 Pigment/Additive | Stable | Stable |
| Ink Formulation 2 Pigment/Additive | Stable | Stable |
| Ink Formulation 3 Pigment/Additive | Stable | Stable |
| Ink Formulation 4 Pigment/Additive | Stable | Stable |
| Ink Formulation 5 Dye/Additive | Stable | Stable |
| Ink Formulation 6 Pigment/Additive | Stable | Stable |
| Ink Formulation 7 Pigment/Additive | Stable | Stable |
| Ink Formulation 8 Pigment/Additive | Stable | Stable |
| Ink Formulation 9 Pigment/Additive | Stable | Stable |

Example 2

Various inks were measured for fluorescent detectability. Each ink was dispensed on a black plastic substrate, having a drop size of about 0.5 µl. A light emitting diode of 365 nm was utilized to excite any fluorescent dispersions and/or fluorescent colorants in the inks. In the present example, inks 1, 13, 14 and 15 were formulated as described above, including a pigment (cyan, magenta or yellow), dispersants, humectants, surfactants, penetrants, a biocide, and other additives. In addition, inks 13, 14 and 15 included a fluorescent dispersion (Fluor-Green Disp. 1 described in Table 1) which emitted light at 505 nm.

Figure 2:
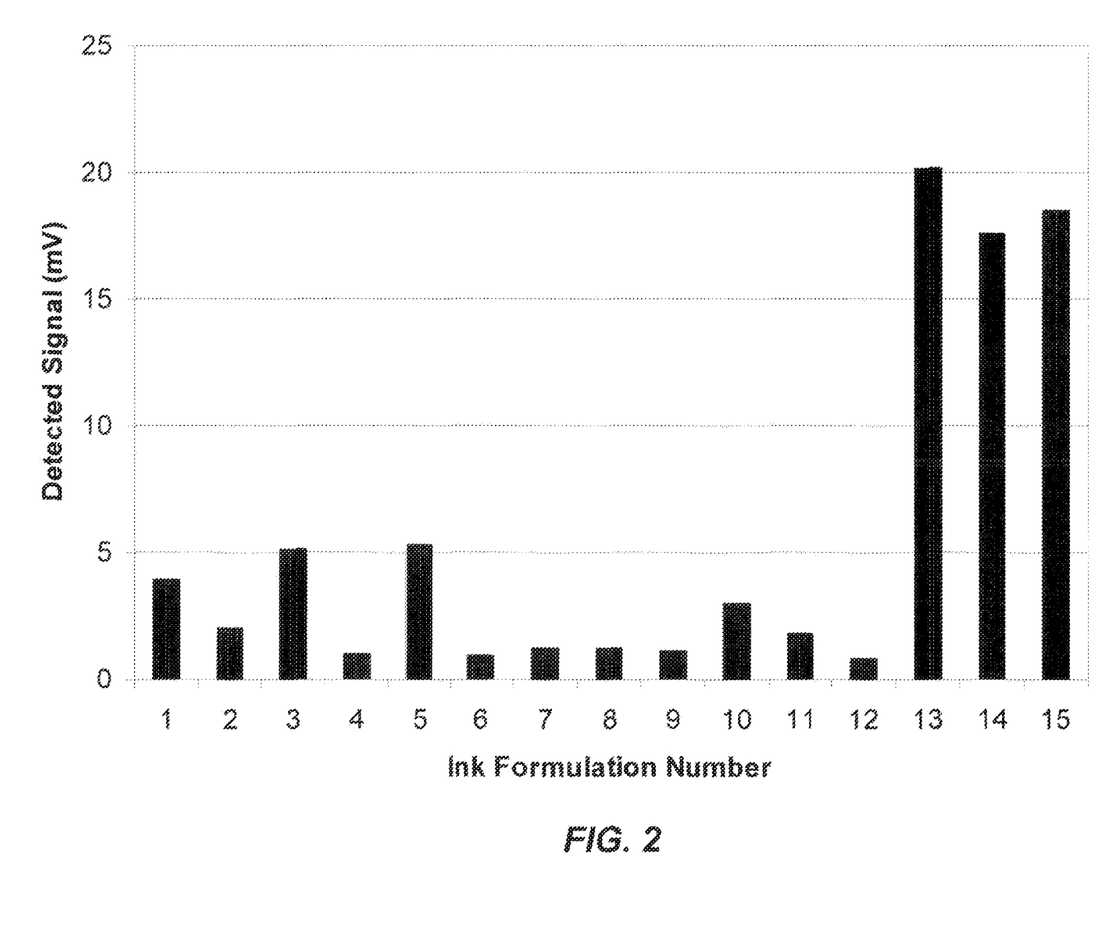
FIG. 2 illustrates a plot of various inks versus the detectable signal of light emitted from the inks upon exposure to light at 365 nm.

The emitted light was then detected by a detector, which converted the light pulses to electrical signals. A UV filter was utilized to purify the excitation UV light from the UV LED and color filters were utilized to block reflected light as well. In the present example color filters were employed to attenuate the reflected light. The filters included Roscolux filters #389 and #19 available from Rosco Laboratories Inc., Stamford, Conn. Table 4 summarizes the various inks tested (cyan, magenta, yellow) and the signal detected for each color filter and FIG. 2 illustrates the magenta test results in graphical form. It is noted that the measurements in the following Tables exhibit a 3% deviation.

TABLE 4

Detectability of the Various Inks

| Ink Formulation Number | Ink | Detected Signal (mV) | | |
|---|---|---|---|---|
| | | #389 Filter Cyan | #19 Filter Magenta | #389 Filter Yellow |
| 1 | Lexmark Pigment Inks | 2.1 | 3.9 | 1.6 |
| 2 | Rushmore Dye Inks | 0.2 | 2 | 0.8 |
| 3 | Canon PFI 101 Pigment Inks | 3.5 | 5.1 | 2 |
| 4 | HP97 Dye Inks | 0.3 | 1 | 1.2 |
| 5 | HP 38 Pigment Inks | 2.5 | 5.3 | 2.2 |
| 6 | HP110 Dye Inks | 0.1 | 0.9 | 0.8 |
| 7 | Epson C88 Pigment Inks | 3.1 | 1.2 | 1.6 |
| 8 | Canon 41 Dye Inks | 0.2 | 1.2 | 1.2 |
| 9 | Epson R800 Pigment Inks | 3 | 1.1 | 1.6 |
| 10 | Kodak 5300 | 1.3 | 3 | 1.5 |
| 11 | WJ Refill | 0.2 | 1.8 | 1 |
| 12 | Lexmark Refill | 0.1 | 0.8 | 0.8 |
| 13 | Lexmark + 0.5% Fluor. Additive | 7 | 20.2 | 25.3 |
| 14 | Lexmark + 0.5% Fluor. Additive, aged 60° C./8 weeks | 4.8 | 17.6 | 19.6 |
| 15 | Lexmark + 0.5% Fluor. Additive, aged ambient/one year | 6.8 | 18.5 | 26.2 |

As can be seen from the above, and in FIG. 2, the inks including a fluorescent dispersion emitted a relatively higher or more intense detectable signal, even after exposure to 60° C. for a period of 8 weeks. For example, prior to aging, the fluorescence of the cyan ink was initially 7.0 mv, which then dropped to the still detectable value of 4.8 mv after 8 weeks at 60° C. (a drop to 68% of the original value) and to 6.8 mv at ambient conditions for one year (a drop to 97% of the original value). Similarly, prior to aging, the fluorescence of the magenta ink was initially 20.2 mv, which then dropped to the still detectable value of 17.6 mv after 8 weeks at 60° C. (a drop to 87% of the original value) and to 18.5 mv at ambient conditions for one year (a drop to only 92% of the original value). Finally, the fluorescence of the yellow ink was initially 25.3 mv, which then dropped to the still detectable value of 19.6 mv after 8 weeks at 60° C. (a drop to 77% of the original value) and to 26.2 mv at ambient conditions for one year (an actual increase of 1% over the original value). This therefore confirms that the change in fluorescence herein may be controlled so as not to fall below 50% of the original fluorescence values after exposure to a temperature of 60° C. for 8 weeks, or ambient temperatures for one year, and in fact may remain in the range of 50-99% of the original detected fluorescence characteristics.

Example 3

Figure 3:
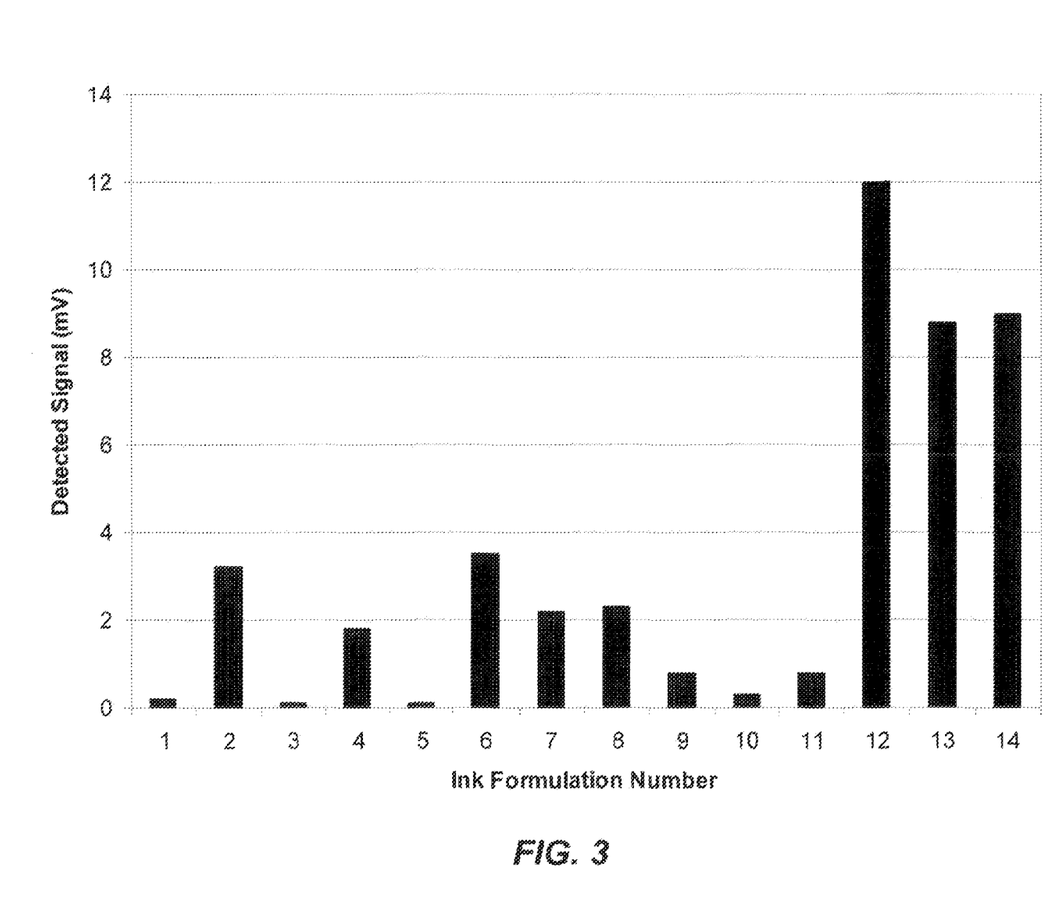
FIG. 3 illustrates a plot of various inks versus the detectable signal of light emitted from the inks upon exposure to light at 365 nm.

A similar set of inks were tested as described above in Example 2, using a different colored filter in the magenta range to simply remove reflected light. The filters included Roscolux filters #389 and #19 available from Rosco Laboratories Inc., Stamford, Conn. In the present example, inks 1, 12, 13 and 14 included a dye (cyan, magenta or yellow), humectants, surfactants, penetrants, binder, a biocide, and other additives. In addition, inks 12, 13 and 14 included a fluorescent additive (Fluor-Green Disp. 1 described in Table 1) which emitted light at 505 nm. Table 5 summarizes the various inks tested and FIG. 3 illustrates the magenta test results.

TABLE 5

Detectability of the Various Inks

| Ink Formulation Number | Dye Ink | Detected Signal (mV) | | |
|---|---|---|---|---|
| | | #389 Filter Cyan | #312 Filter Magenta | #389 Filter Yellow |
| 1 | Lexmark Dye ink | 0.2 | 0.2 | 0.8 |
| 2 | Canon PFI 101 Pigment Inks | 3.5 | 3.2 | 2 |
| 3 | HP97 Dye Inks | 0.3 | 0.1 | 1.2 |
| 4 | HP 38 Pigment Inks | 2.5 | 1.8 | 2.2 |
| 5 | HP110 Dye Inks | 0.1 | 0.1 | 0.8 |
| 6 | Epson C88 Pigment Inks | 3.1 | 3.5 | 1.6 |
| 7 | Canon 41 Dye Inks | 0.2 | 2.2 | 1.2 |
| 8 | Epson R800 Pigment Inks | 3 | 2.3 | 1.6 |
| 9 | Kodak 5300 | 1.3 | 0.8 | 1.5 |
| 10 | WJ Refill | 0.2 | 0.3 | 1 |
| 11 | Lexmark Refill | 0.1 | 0.8 | 0.8 |
| 12 | Lexmark + Fluor. Additive | 11.2 | 12 | 30.8 |
| 13 | Lexmark + Fluor. Additive, aged 60° C./8 weeks | 10.1 | 8.8 | 26.8 |
| 14 | Lexmark + Fluor. Additive, aged ambient/one year | 10 | 9 | 28.5 |

As can be seen from the above, and in FIG. 3, the inks including a fluorescent dispersion emitted a relatively higher or more intense detectable signal, even after exposure to 60° C. for a period of 8 weeks. For example, prior to aging, the fluorescence of the cyan ink was initially 11.2 mv, which then dropped to the still detectable value of 10.1 mv after 8 weeks at 60° C. (a drop to 90% of the original value) and to 10.0 mv at ambient conditions for one year (a drop to 89% of the original value). Similarly, prior to aging, the fluorescence of the magenta ink was initially 12.0 mv, which then dropped to the still detectable value of 8.8 mv after 8 weeks at 60° C. (a drop to 73% of the original value) and to 9.0 mv at ambient conditions for one year (a drop to only 75% of the original value). Finally, the fluorescence of the yellow ink was initially 30.8 mv, which then dropped to the still detectable value of 26.8 mv after 8 weeks at 60° C. (a drop to 87% of the original value) and to 28.5 mv at ambient conditions for one year (a drop to 92% of the original value). This therefore again confirms that the change in fluorescence herein may be controlled so as not to fall below 50% of the original fluorescence values after exposure to a temperature of 60° C. for up to 8 weeks, or ambient temperatures for one year, and in fact may remain in the range of 50-99% of the original detected fluorescence characteristics.

Example 4

Figure 4:
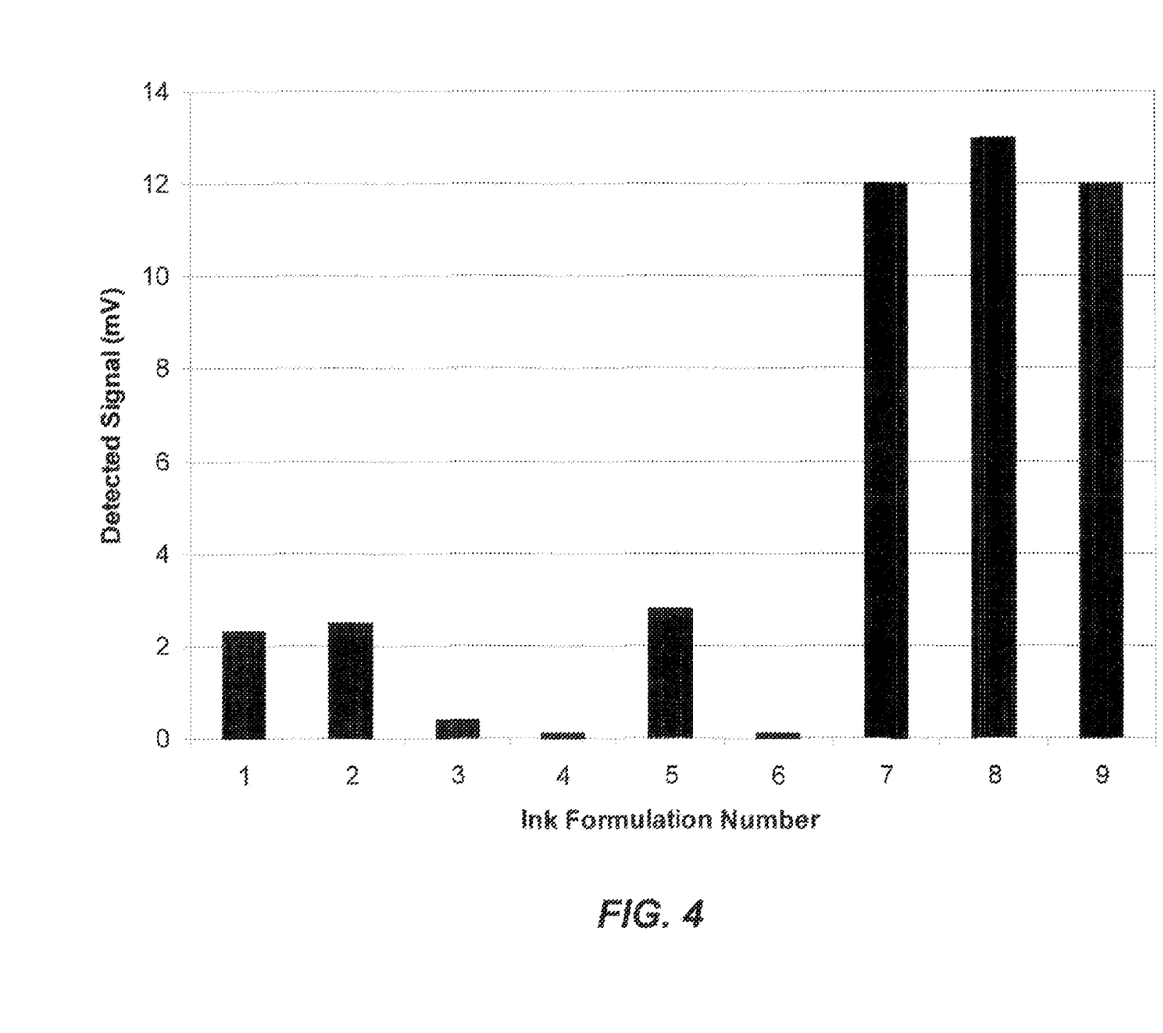
FIG. 4 illustrates a plot of various inks versus the detectable signal of light emitted from the inks upon exposure to light at 365 nm.

A similar test was performed as described in Example 2. However, the UV filter was removed from the testing set up. In the present example, inks 1, 7, 8 and 9 in the table below were formulated as described above, including a pigment (black), dispersants, humectants, surfactants, a penetrants, binder, a biocide, and other additives. In addition, inks 7, 8 and 9 included a fluorescent dispersion (Fluor-Yellow Disp. 1 described in Table 1) which emitted light at 549 nm. The results were again measured using a phototransistor with a Roscolux #312 color filter available from Rosco Laboratories Inc., Stamford, Conn. Table 6 summarizes the toner formulations and FIG. 4 illustrates the results.

TABLE 6

Detectability of the Various Inks

| Ink Formulation Number | Ink | Detected Signal (mV) |
|---|---|---|
| 1 | Lexmark | 2.3 |
| 2 | Epson R800 | 2.5 |
| 3 | WJ refill K | 0.4 |
| 4 | HP C8750 K | 0.1 |
| 5 | Pepper K | 2.8 |
| 6 | Epson T043 | 0.1 |
| 7 | Lexmark + 0.4% Fluor. Additive | 12 |
| 8 | Lexmark + 0.4% Fluor. Additive, aged 60° C./8 weeks | 13 |
| 9 | Lexmark + 0.4% Fluor. Additive, aged ambient/one year | 12 |

As can be seen from the above, and in FIG. 4, the inks including a fluorescent dispersion emitted a relatively higher or more intense detectable signal, even after exposure to 60° C. for a period of 8 weeks. For example, prior to aging, the fluorescence of the black ink was initially 12.0 mv, which then actually increased to a value of 13.0 mv after 8 weeks at 60° C. (an increase of 1.0% of the original value) and remained at 12.0 mv at ambient conditions for one year.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A fluorescent inkjet composition, comprising:
a visible ink composition including a visible colorant, wherein said visible colorant is detectable in a visible spectrum, and present at about 0.5% to about 10% by weight of the fluorescent inkjet composition; and
a fluorescent dispersion including an invisible fluorescent colorant;
wherein said invisible fluorescent colorant absorbs light having a wavelength of 250 to 400 nm, emits light in the range of 450 to 700 nm, and is invisible to incident light in the visible spectrum of 380 to 750 nm,
wherein said invisible fluorescent colorant is present between 0.01% to 1.5% by weight of the fluorescent inkjet composition, and
wherein said fluorescent inkjet composition emits light at a first intensity $I_1$ in the range of 450 nm to 700 nm upon excitation by incident light having a wavelength in the range of 250 to 400 nm and said fluorescent inkjet composition is capable of emitting light at a second intensity $I_2$ upon exposure to a temperature of 60° C. for 8 weeks, wherein $I_2 = (0.50 \text{ to } 1.0) * I_1$.

2. The fluorescent inkjet composition of claim 1, wherein said invisible fluorescent colorant is a pigment.

3. The fluorescent inkjet composition of claim 1, wherein said invisible fluorescent colorant is a UV fluorescent pigment.

4. The fluorescent inkjet composition of claim 1, wherein said invisible fluorescent colorant exhibits a particle size in the range of 25 to 200nm.

5. The fluorescent inkjet composition of claim 1, wherein said fluorescent dispersion includes a dispersant selected from the group consisting of a polymeric dispersant, alkali salts, lignin, lignin derivatives, and combinations thereof.

6. The fluorescent inkjet composition of claim 1, wherein said invisible fluorescent colorant comprises an organic pigment containing exclusively aromatic groups.

7. The fluorescent inkjet composition of claim 6, wherein said organic pigment comprises xanthene.

8. The fluorescent inkjet composition of claim 6, wherein said organic pigment comprises thio-xanthene.

9. The fluorescent inkjet composition of claim 6, wherein said invisible fluorescent colorant is in particle form and said particles are encapsulated in a polysiloxane polymer.

10. A fluorescent inkjet composition, comprising:
a visible ink composition including a visible colorant, wherein said visible colorant is detectable in a visible spectrum, and present at about 0.5% to about 10% by weight of the fluorescent inkjet composition; and
an aqueous dispersion including an invisible fluorescent colorant;
wherein said invisible fluorescent colorant absorbs light having a wavelength of 250 to 400 nm, emits light in the range of 450 to 700 nm, and is invisible to incident light in the visible spectrum of 380 to 750 nm,
wherein said invisible fluorescent colorant is present between 0.01% to 1.5% by weight of the fluorescent inkjet composition, and
wherein said fluorescent inkjet composition emits light at a first intensity $I_1$ in the range of 450 nm to 700 nm upon excitation by incident light having a wavelength in the range of 250 to 400 nm and said fluorescent inkjet composition is capable of emitting light at a second intensity $I_2$ upon exposure to a temperature of 60° C. for 8weeks, wherein $I_2 = (0.50 \text{ to } 1.0) * I_1$.

11. The fluorescent inkjet composition of claim 10, wherein said invisible fluorescent colorant comprises a metal complex organic pigment.

12. The fluorescent inkjet composition of claim 10, wherein said invisible fluorescent colorant comprises an aromatic organic pigment.

13. The fluorescent inkjet composition of claim 12, wherein said invisible fluorescent colorant is in particle form and said particles are encapsulated in a polysiloxane polymer.

14. A method of providing a fluorescent inkjet composition, comprising:
combining a fluorescent dispersion including an invisible fluorescent colorant with a visible ink composition including a visible colorant;
wherein said visible colorant is detectable in a visible spectrum, and present at about 0.5% to about 10% by weight of the fluorescent inkjet composition, wherein said invisible fluorescent colorant absorbs light having a wavelength of 250 to 400 nm, emits light in the range of 450 to 700 nm, and is invisible to incident light in the visible spectrum of 380 to 750 nm, wherein said invisible fluorescent colorant is present between 0.01% to 1.5% by weight of the fluorescent inkjet composition, and wherein said fluorescent inkjet composition emits light at a first intensity $I_1$ in the range of 450 nm to 700 nm upon excitation by incident light having a wavelength in the range of 250 to 400 nm and said fluorescent inkjet composition is capable of emitting light at a second intensity $I_2$ upon exposure to a temperature of 60° C. for 8 weeks, wherein $$I_2=(0.50 \text{ to } 1.0)*I_1.$$

15. The method of claim 14, wherein said invisible fluorescent colorant is a pigment.

16. The method of claim 14, wherein said invisible fluorescent colorant is a UV fluorescent pigment.

17. The method of claim 14, wherein said invisible fluorescent colorant exhibits a particle size in the range of 25 to 200 nm.

18. The method of claim 14, wherein said fluorescent dispersion includes a dispersant selected from the group consisting of a polymeric dispersant, alkali salts, lignin, lignin derivatives, and combinations thereof.

19. The fluorescent inkjet composition of claim 1, wherein said visible colorant exhibits a color including black, cyan, magenta or yellow, and combinations thereof.

20. The fluorescent inkjet composition of claim 10, wherein said visible colorant exhibits a color including black, cyan, magenta or yellow, and combinations thereof.

21. The method of claim 14, wherein said visible colorant exhibits a color including black, cyan, magenta or yellow, and combinations thereof.

* * * * *